United States Patent [19]
Fitzgerald et al.

[11] Patent Number: 4,909,759
[45] Date of Patent: Mar. 20, 1990

[54] TERMINAL UNIT FOR CABLE PAIRS IN TELECOMMUNICATION SYSTEM

[75] Inventors: Robert A. W. Fitzgerald, Bateau Bay; Hans-Dieter Bippus, Holgate; Bryce L. Nicholis, Avoca Beach, all of Australia

[73] Assignee: Krone Aktiengesellschaft, Berlin, Fed. Rep. of Germany

[21] Appl. No.: 203,317

[22] Filed: Jun. 6, 1988

[30] Foreign Application Priority Data

Jun. 5, 1987 [AU] Australia ................. PI2339

[51] Int. Cl.⁴ .......................... H01R 13/60
[52] U.S. Cl. ................... 439/540; 439/284; 439/557; 439/567
[58] Field of Search .......... 439/284, 290–295, 439/351–358, 733, 743–749, 544, 549, 552, 555, 557, 558, 562, 567, 540

[56] References Cited

U.S. PATENT DOCUMENTS

| | | | |
|---|---|---|---|
| 3,281,753 | 10/1966 | Fink | 439/557 |
| 3,289,145 | 11/1966 | Ruehlemann et al. | 439/357 |
| 3,569,909 | 3/1971 | Garver | 439/353 |
| 4,413,871 | 11/1983 | Swengel, Jr. | 439/620 |
| 4,443,050 | 4/1984 | Taylor | 439/620 |
| 4,536,052 | 8/1985 | Baker et al. | 439/544 |
| 4,708,662 | 11/1987 | Klein | 439/357 |

FOREIGN PATENT DOCUMENTS

| | | | |
|---|---|---|---|
| 2804478 | 11/1982 | Fed. Rep. of Germany | |
| 2811812 | 4/1984 | Fed. Rep. of Germany | |
| 0042394 | 4/1978 | Japan | 439/571 |

Primary Examiner—David Pirlot
Attorney, Agent, or Firm—McGlew & Tuttle

[57] ABSTRACT

This invention relates to a terminal unit for cable pairs in telecommunication systems, comprising an electrical connector made of two plastic bodies each having a cutting and clamping contact inserted thereinto. The cutting and clamping contacts extend into clamping slots of the connector for cable pairs. The connectors are affixed to a mounting frame for receiving said electrical connectors. The plastic bodies forming the contact housings are advantageously identical and preferably each receives a pair of cutting and clamping contacts. Each connector housing body is provided on its base face opposed to the clamping slots with latching elements for joining together two said plastic bodies to form a casing the casing is provided on two opposed outer faces with latching structures, by means of which the two said plastic bodies are releasably latchable in an aperture of a mounting frame to permit both said plastic bodies to protrude on either side from said mounting frame.

16 Claims, 13 Drawing Sheets

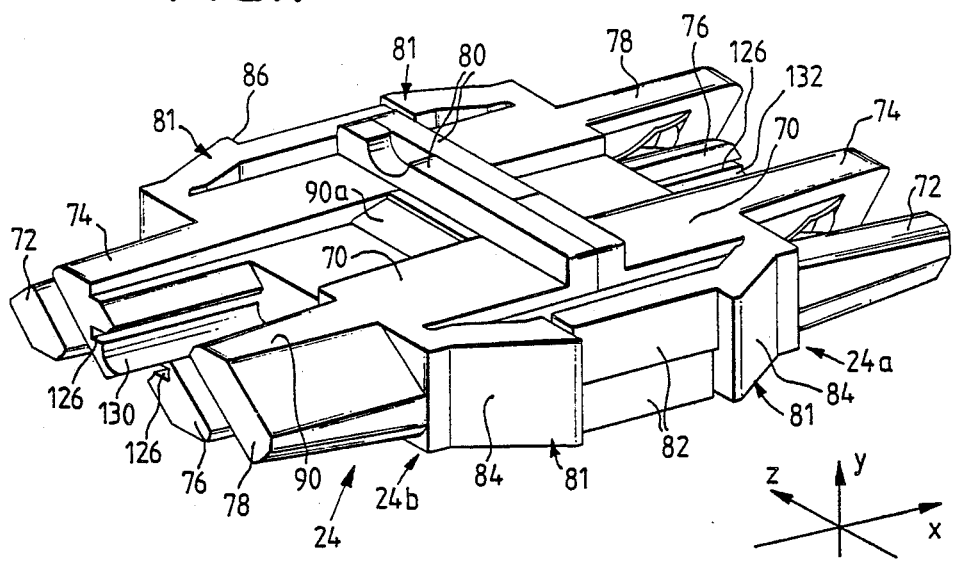
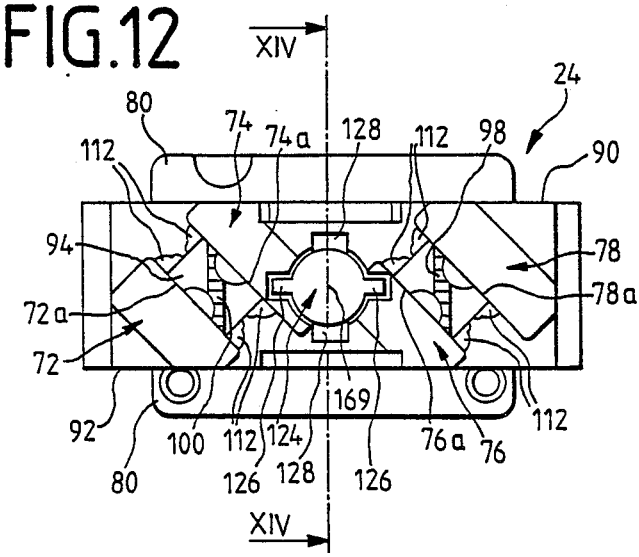

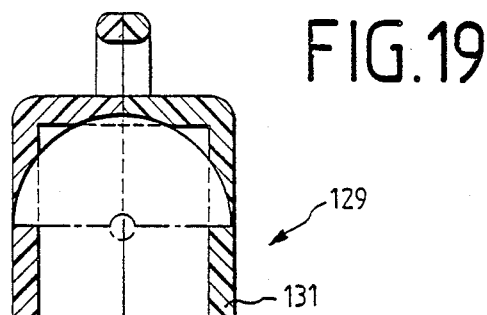
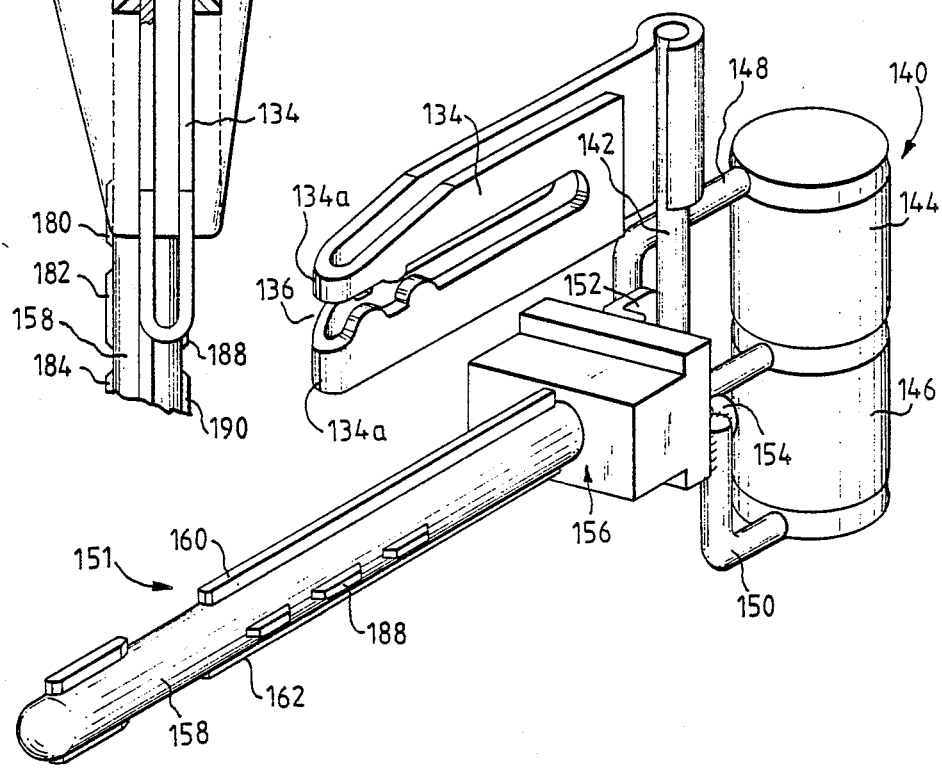

4,909,759

TERMINAL UNIT FOR CABLE PAIRS IN TELECOMMUNICATION SYSTEM

BACKGROUND OF THE INVENTION

Field of the invention

This invention relates in general to electrical connectors and in particular to a new and useful terminal unit for cable pairs in telecommunication systems.

A similar terminal unit is known from German Patent DE 28 11 812. In this terminal unit, the electrical connectors, being regularly configured for 10 cable pairs, are provided on their front sides with holding slots, and the mounting frame is provided with two parallel rows of holding tongues engaging the holding slots when plugging the electrical connectors on. The clamping slots with the contact slots of the cutting and clamping contacts for the cable pairs are arranged in two parallel rows in regular, identical height. The configuration of the electrical connectors consisting of two plastic bodies each of different configuration is described in more detail in German Patent DE 28 04 478. Herein, one row of cutting and clamping contacts serves for connecting the incoming cable-pairs, and the other row of the cutting and clamping contacts serves for connecting the outgoing cable pairs.

It is disadvantageous with the known terminal unit that the incoming as well as the outgoing cable pairs must be connected from the same side of the terminal unit with the cutting and clamping contacts, and that it is not possible to remove individual faulty electrical connectors and to replace them with out affecting the remaining connectors.

SUMMARY OF THE INVENTION

The invention provides a terminal unit for which wiring of the incoming or outgoing cable pairs from different sides of the mounting frame is possible, and for which, further, individual faulty connectors can be removed and replaced without affecting the remaining connectors.

According to the invention two sections of each connector are made symmetrical and identical. By arranging the connections such that they are latched in the openings of a mounting frame, it is possible to allow for the connection of incoming cable pairs at one side of the mounting frame and outgoing cable pairs on the other side. Further, groups of electrical connectors can be arranged in a simple way on suitably punched mounting frames in arbitrary configurations. It is possible then, to remove individual faulty connectors and to replace them without affecting the remaining connectors.

Accordingly, it is an object of the invention to provide a terminal for telecommunications systems cable pairs which includes a cutting and clamping contact housing having two housing parts with interengageable end portions which together define releasable latching means holding them together and with each part defining a slot for a receiving cable which is engageable in the slot into connection with the contacts including a plurality of contact housing receiving slots, said contact housings having a projecting latch portion which permits them to be interengaged with said mounting frame on either side thereof by engagement of said latch member through a slot.

A further object of the invention is to provide a terminal for telecommunications systems which is simple in design, rugged in construction and economical to manufacture.

BRIEF DESCRIPTION OF THE DRAWINGS

In the drawings:

FIG. 9 is an enlarged perspective view of an electrical connector of the invention;

FIG. 12 is a front elevational view of the connector of FIG. 9;

FIG. 19 is a cross sectional view taken along the line 19—19 of FIG. 17, of the over-voltage protection unit of FIG. 17;

FIG. 20 is a perspective view of the internal components of the over-voltage protector unit of FIG. 17.

DESCRIPTION OF THE PREFERRED EMBODIMENTS

Figure 1:
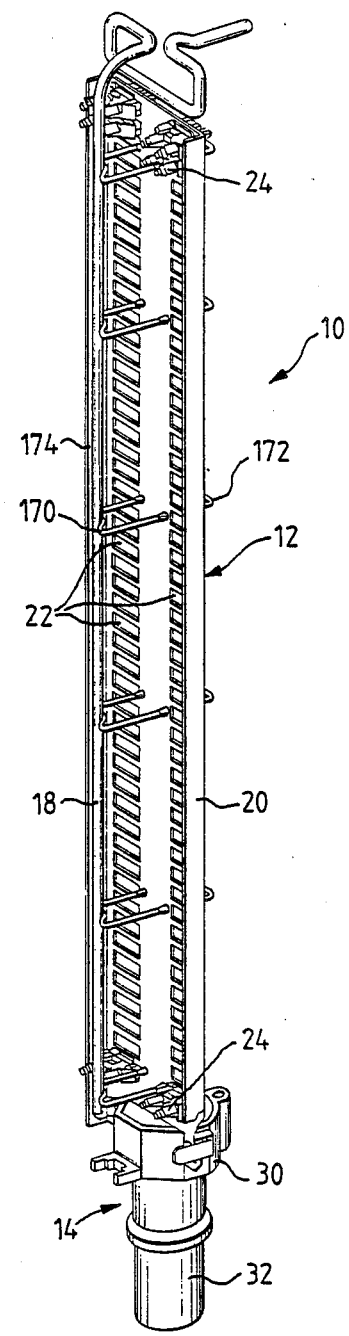
FIG. 1 is a perspective view of a terminal unit including electrical connectors constructed in accordance with the invention.

The terminal for the telecommunication system cable pairs generally designated (10) in FIG. 1 comprises a mounting frame (12) which in the embodiment illustrated is vertically elongated and has a plurality of rows of vertically extending spaced upon slots (22) which accommodate and hold individual cable cutting and clamping contact housings (24). In accordance with a feature of the invention the housings (24) include latching elements which enable them to be inserted into the slots of the mounting frame from either side thereof. In addition the housings (24) are made up of two housing portions (24a) and (24b) each of which is provided with a cavity or recess which is constructed to hold each cutting and clamping contact in a housing or casing which has a slot for receiving the cable pairs in a position to permit them to be cut and clamped to the associated contact and which is readily accessible when the housing (24) is mounted on a mounting frame.

The terminal unit (10) shown in FIG. 1 is designed to permit interconnection between cable pairs associated with particular telephones or lines to a telephone exchange.

The unit (10) comprises a mounting frame (12) which is in the form of an elongated channel-like structure mounted on a frame carrier (14).

Figures 5, 6:
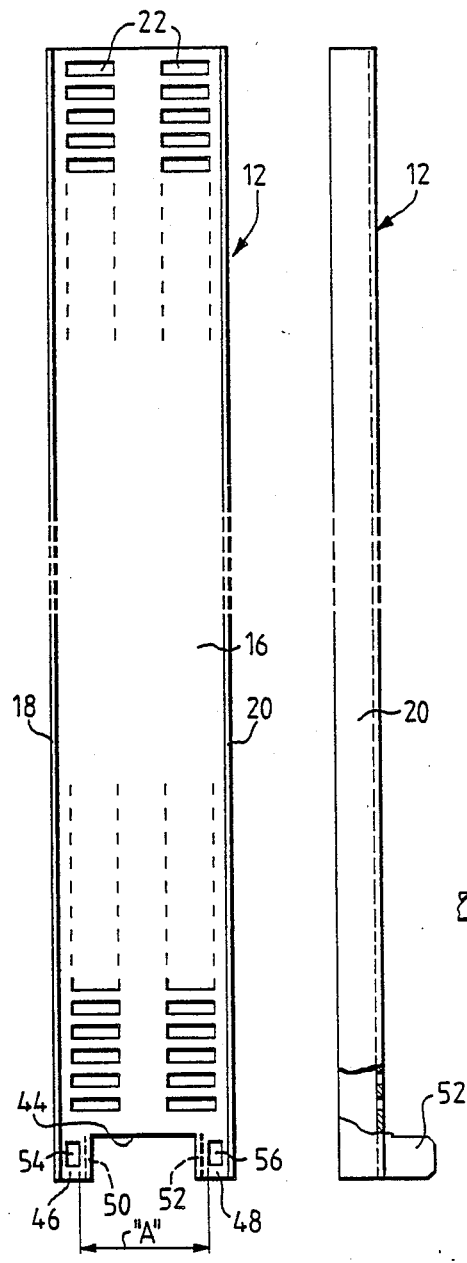
FIG. 5 is a front elevational view of a mounting frame incorporated into the unit of FIG. 1.
FIG. 6 is a side elevational view of the mounting frame of FIG. 5.
Figure 7:
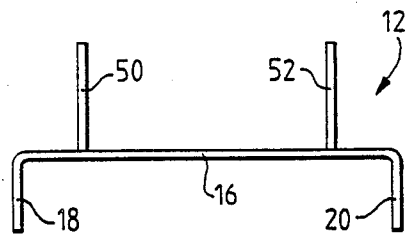
FIG. 7 is a plan view of the mounting frame of FIG. 6.

The mounting frame (12) is shown in more detail in FIGS. 5, 6 and 7 as comprising a central lengthwise extending web portion (16) with opposed side flanges (18, 20). The web portion (16) is provided with two lengthwise extending rows of apertures (22), these apertures being of rectangular configuration. Apertures (22) receive electrical connectors (24) described in later detail later. There are, then, two rows of these connectors supported on the frame (12), one row adjacent to each of the flanges (18, 20).

Figure 2:
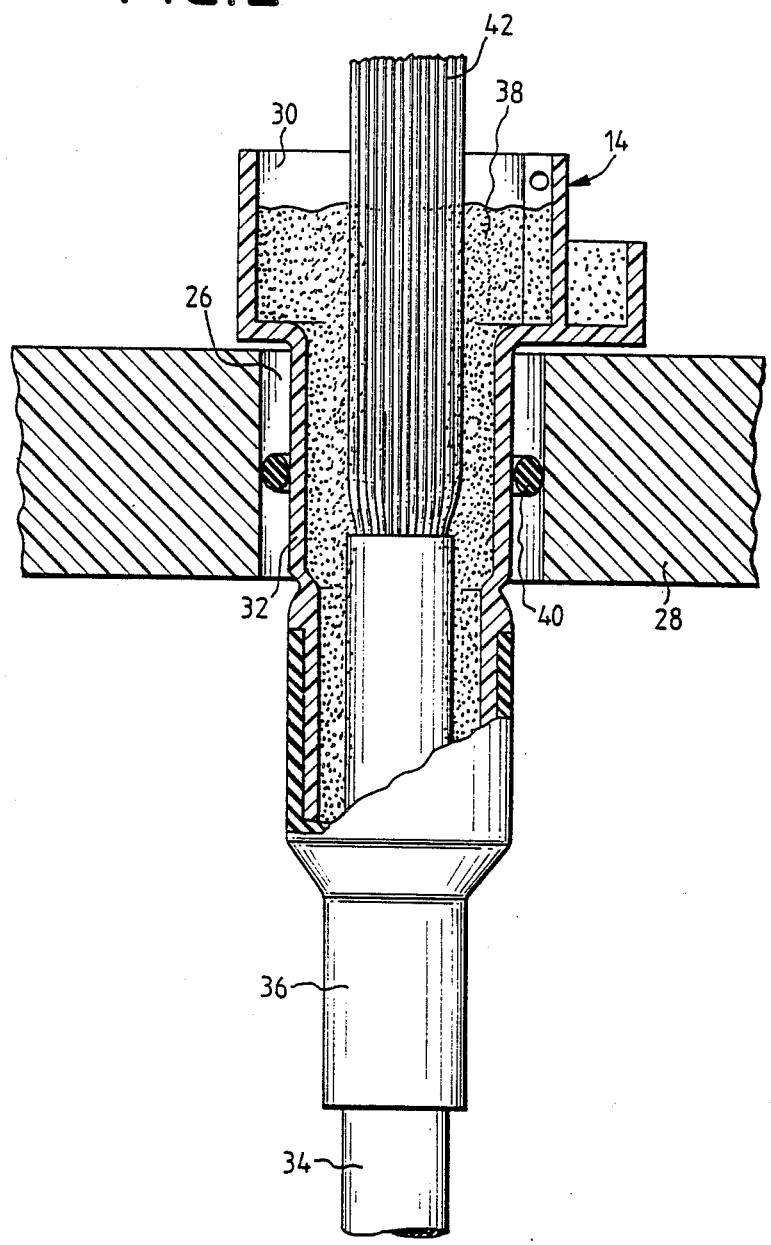
FIG. 2 is an axial cross section of a frame carrier forming part of the terminal unit in FIG. 1.

The frame carrier (14) is, as shown in FIG. 2, designed to fit into the base (28) of a telephone cross-connection unit which normally, rests on a ground surface. The carrier (14) has an upper portion (30), which is then positioned above the base (28), and a downwardly depending cylindrical portion (32).

A heat-shrunk tube (36) is provided around the portion (32), at its lower end, and around a portion of the cable (34) where cable 34 enters the portion (32) of the carrier (14). This tube (36), together with suitable sealing compound (38) which is positioned within the carrier (14) (and particularly within the position (32) thereof), provides a seal around the cable (34) where this enters the carrier (14). The gap between the exterior of the portion (32) and the periphery of the opening (26) is sealed by a resilient O-ring (40).

The cable (34) includes numerous cable pairs (42) and these extend upwardly through the sealing compound (38) and into the carrier (14) itself to make interconnections with individual ones of the connectors (24) on the frame (12).

As particularly shown in FIG. 5, the central web portion (16) has, at its lower end, a central cut-out (44) so that to either lateral side of the cut-out, the web portion (16) defines downwardly depending legs (46, 48). Also, at the inner edges of the legs (46 and 48), the web portion (16) is deformed to define respective fingers (50, 52) which extend normally to the median plane of the web portion (16) and to the opposite side of the web potion (16) to the side to which the flanges (18, 20) extend. The legs (46 and 48) also have respective rectangular apertures (54, 56) therein.

Figure 3:
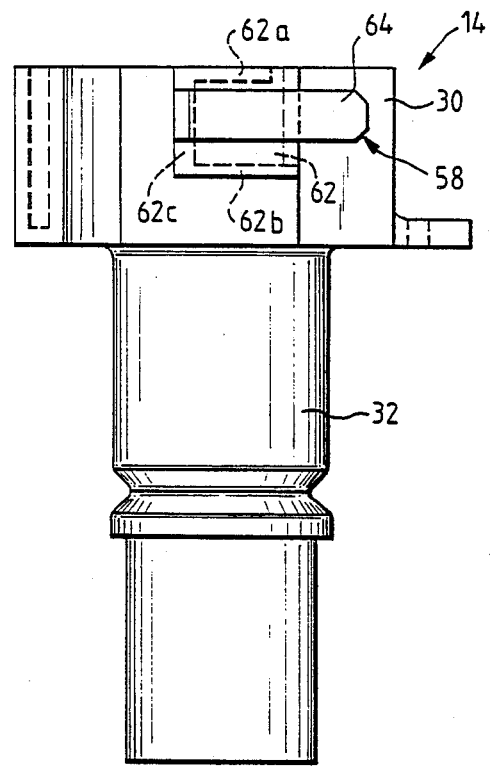
FIG. 3 is a side elevational view of the frame carrier of FIG. 2.
Figure 4:
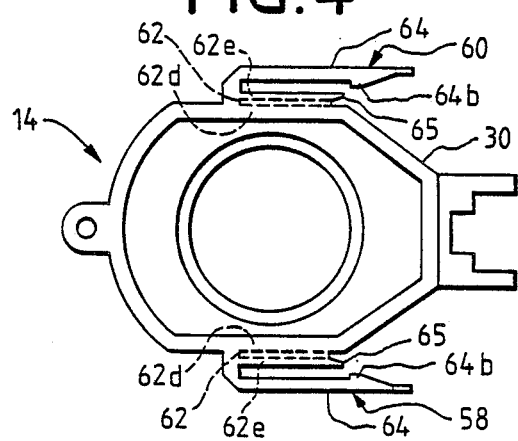
FIG. 4 is a top plan view of the frame carrier of FIG. 2.
Figure 8:
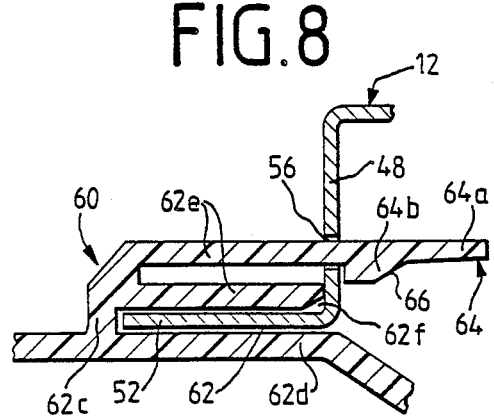
FIG. 8 is an enlarged fragmentary horizontal cross-section showing the interconnection between the frame carrier of FIG. 2 and the mounting frame of FIG. 5.
Figures 10, 11:
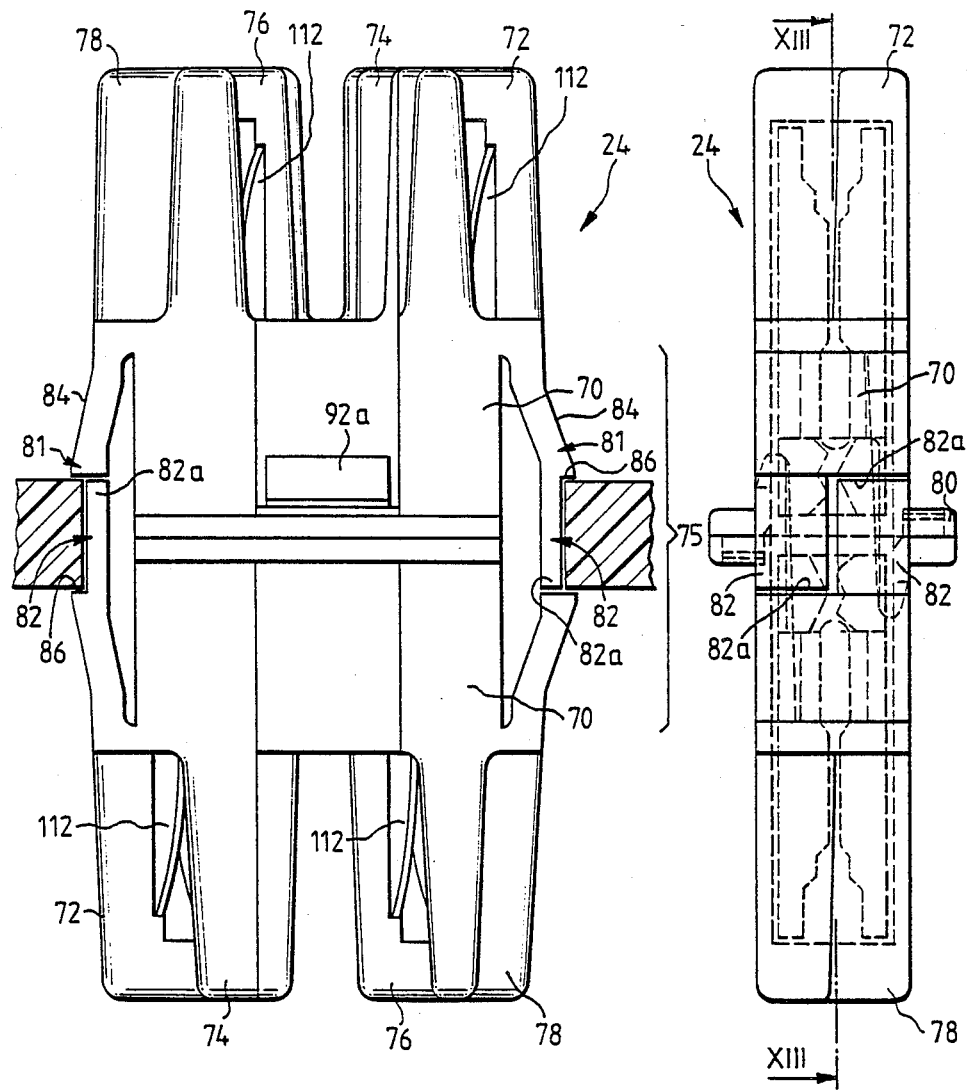
FIG. 10 is a top plan view of the connector of FIG. 9.
FIG. 11 is a side elevational view of the connector of FIG. 9.

The upper portion (30) of the frame carrier (14) has, at opposite sides thereof, retaining structures (58, 60) which cooperate with the legs (46 and 48) and the fingers (50, 52) to releasably retain the mounting frame (12) on the frame carrier (14). The structures (58, 60) are generally similar and the following description of the structure (60) made with particular reference to FIG. 8 is to be understood as being applicable to the structure (58), like reference numerals relating to like components of the two structures. In particular, the structure 60 includes a horizontally extending pocket (62) which is sidewardly open but, as shown by broken lines in FIG. 3, is closed at upper, lower and inner ends thereof by wall portions (62a, 62b, 62c) or portion (30) of the frame carrier (14). The pocket (62) is also closed at either lateral side by an inner side wall portion (62d) formed on portion (30) and outer side wall portion (62e) formed on portion (30). The side portions (62d, 62e) are best shown in FIG. 8. A tongue (64) is formed integrally with the remainder of the portion (30) of carrier 14), being interconnected on the wall (62e) at a location remote from the sidewardly open entrance (62f) (FIG. 8) of the pocket (62). From the position of interconnection, the tongue (64) extends forwardly, adjacent to but spaced from the wall portion (62e), to an outer end (64a) of the tongue.

The inner face of the tongue (64) has a latching abutment (64b) thereon and the spacing between the abutment (64b) on the tongues of the two structures (58) and (60) is so arranged as to enable a latching action to be achieved when the mounting frame (12) is assembled to the frame carrier (14). More particularly, FIG. 8 shows the positioning of the mounted frame (12) relative to the structure (60). The finger (52) is dimensioned so as to correspond to the shaping of the pocket (62) and is shown as being received neatly within the pocket (62). At that same time, the tongue (64) extends through the aperture (56) in the leg (48) of the frame (12). The abutment (64b) is located so that a portion of the leg (48) between the aperture (56) and the finger (52) is retained between the abutment (64b) and the "forward" or outer end (65) of the wall portion (62e), at the entrance (62f) to pocket (62).

The spacing between the opposed surfaces of the abutments (64b) on the tongues (64) associated with respective structures (58) and (60) is arranged to be somewhat less than the spacing "A" (FIG. 5) between opposed inner edges of the apertures (54, 56). Thus, in order to assemble the frame (12) onto the frame carrier (14), the frame (12) is first positioned in upright disposition with the legs (46 and 48) adjacent to, but outboard of the free ends (64a) of the tongues (64) on structures (58, 60). Then, the frame (12) is advanced horizontally towards the frame carrier (14) so that the tongues (64) of the structures (58, 60) enter the respective apertures (54, 56) on the legs (46 and 48). At the same time, the fingers (50, 52) are entered into the pockets (62) associated with the respective structures (58, 60). As this motion continues, the inner edges of the apertures (54, 56) strike inner inclined surfaces (66) on the abutments (64b) so distending the outer ends of the tongues (64) away form each other. This motion continues until the legs (46 and 48) pass the abutments (64b), and abut against outer ends (65) of the wall portions (62e) of the two structures (58, 60). As this occurs, the legs (48) pass the abutments (64b), whereupon the outer ends of the tongues (64) are moved back again towards each other under natural resilience thereof, to assume the position shown in FIG. 8 at which the legs (46 and 48) are captured in the structures (58, 60).

It is possible to remove the frame (12) from the frame carrier (14) by manually outwardly distending the tongues (64) of the two structures (58, 60) one relative to the other to permit the abutments (64b) to pass through the apertures (54, 56), whereupon the frame (12) can be withdrawn, accompanied by withdrawal of the fingers (50, 52) from the pockets (62).

When the frame (12) is in its mounted position on the carrier (14), the fingers (50, 52) ensure that the mounting frame (12) is retained in a fashion preventing substantial movement relative to the frame carrier (14). In particular, upward movement of the mounting frame (12) relative to the frame carrier 14) is prevented by interengagement between the fingers (50, 52) and respective wall portions (62a) of the structures (58, 60). Similarly, downward movement is prevented by engagement between the fingers and the wall portions (62b) of the structures (58, 60), whilst horizontal inward or outward movement relative to the carrier (14) is precluded by the described capturing of the legs (46, 48) between the abutments (64b) and the outer ends (65) of the walls (62e) on the respective structures (58, 60).

One connector (24) is shown in more detail in FIGS. 9 to 14 as comprising two electrically insulative molded plastics body sections (24a, 24b) secured together. These are in the form of like plastics moldings which are snap fastened together. In the following description, like parts of sections (24a, 24b) are designated by like reference numerals. Thus, each body section includes a main body portion (70) from which extend four guides in the form of guide projections (72, 74, 76, 78). As shown in transverse section of the connector, the body portions (70) are of rectangular cross-section corresponding to the rectangular cross-section of the apertures (22) in the mounting frame (12), but being of slightly lesser dimensions so as to permit insertion of a connector (24) into a respective aperture (22) by movement in the lengthwise direction of extent of the connector (24), designated as corresponding to the axis "x" noted in FIG. 9. The body portions (70) together define a casing (74) (FIG. 10) from which the projections (72, 74, 76, 78) extend at either end.

By means described later, the two sections (24a, 24b) are assembled together with the body portions (70) in abutment so that the projections (72, 74, 76) on each extend in opposite directions away from the plane of abutment, as mentioned. The relative orientation of the section (24b) with reference to the section (24a) in the assembled condition of the two sections may be understood by reference to the axes "x", "y" and "z" which are mutually perpendicular to each other and noted in FIG. 9. As mentioned, the axis "x" corresponds to the direction of extent of the projections (72, 75, 76, 78). The axis "y" is a "transverse" dimension of the connector and axis "z" is a vertical or upright axis. Relatively speaking, the section (24a) would be oriented in the same fashion as the section (24b), when viewed in FIG. 9, if it were rotated through 180° about the "z" axis shown.

At inner ends of the body portions (70), each such portion is provided with two transversely extending and co-planar flanges (80), one at the "upper" major face thereof and another at the "lower" major face thereof. Flanges (80) on section (24a) abut with and are aligned with flanges (80) on the section (24b).

The connector (24) may be mounted on the mounting frame (12) by insertion of the connector through an aperture (22) such that the projections (72, 74, 76, 78) at either end thereof are first passed through the aperture until the flanges (80) on the respective section (24a or 24b) abut with the surface of the central web portion (16) surrounding that aperture.

Each of the sections (24a, 25b) is provided at either lateral side with resiliently deformable latching structure (81) including a tongue (82). These tongues have inclined outer surfaces (84) and, during insertion of the connector into an aperture (22) the side surfaces of the aperture (22) at first strike the surfaces (84) on the tongues (82) of that one of the sections (24a, 24b) which is first passed into the aperture (22), thus to inwardly resiliently deform these tongues (82) until, under continued insertion movement, and immediately before the flanges (80) abut the central web portion (16) of the mounting frame (12), the tongues (82) pass through the aperture to an extent that the surfaces (84) are entirely cleared through the aperture (22) and inward steps (86) of the tongues (82) also pass through the aperture. Then, the tongues (82) may spring outwardly, since they are no longer engaged by the side edges of the aperture, the connector then being held in position by capturing of part of the central web portion (16) surrounding the aperture (22) between the steps (86) and the flanges (80). This action is similar, regardless of whether section (24a) or section (24b) is first passed through the aperture (22).

Free ends (82a) of the tongues (82), remote from the surfaces (84) may, however, be inwardly sprung towards each other so as to cause the surfaces 84 to likewise move inwardly to an extent sufficient to enable tongues (82) to pass through the aperture (22), to permit the connector (24) to be withdrawn from its retaining aperture (22), when required.

As best shown for example in FIG. 9, the projections (72, 74, 76, 78) are generally rectangular in cross section, but arranged so that lengthwise extending side faces thereof, including side faces (72a, 74a, 76a, 78a) on respective projections (72, 74, 76, 78) are inclined 45° relative to parallel upper and lower faces (90) and (92) of the respective body portion (70). There is thus a gap which forms a clamping slot (96) between the projections (76, 78). The clamping slot (94) is defined between surfaces (72a, 74a) and clamping slot (96) is defined between surfaces (76a, 78a). Electrically conductive contacts (98 and 100) are positioned within these respective gaps.

Figure 15:
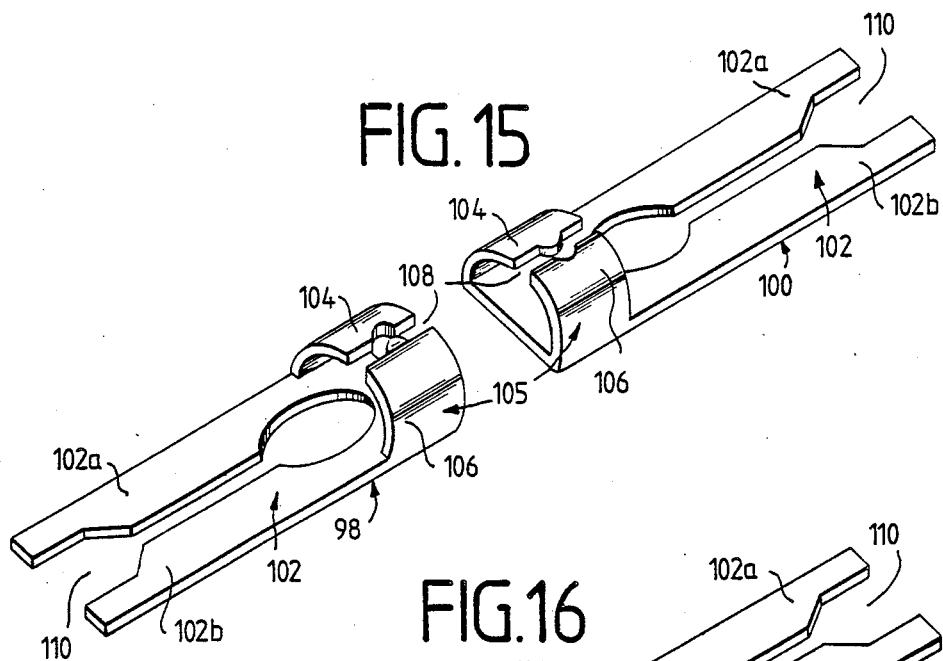
FIG. 15 is a perspective view showing disconnection contacts which are capable of incorporation into the connector of FIG. 9.

Contacts (98, 100) are in the form of "disconnection" contacts and are of the form shown in FIG. 15. Thus each has a cutting/clamping contact (102) having, at an inner end, opposed flanges (104, 106) which extend sidewardly therefrom, but which are deformed out of the plane of the cutting/clamping contact (102), they define in transverse section the generally C-shaped configuration shown. The free ends of the flanges (104, 106) are adjacent but closely spaced so as to define a gap (108) therebetween. The flanges (104, 106) define an inner contact part (105) of the respective contact (98, 100), the purpose of which part (105) is described later.

The cutting/clamping contact (102) is bifurcated, having two parallel legs (102a, 102b) between which there is defined a gap (110) open to the outer end of the respective contact, that is the end opposite flanges (104, 106).

The flanges (104, 106) and the adjacent part of the cutting/clamping contact (102) are retained within the interior of the main body portion (70) of the respective section (24a or 24b), with the cutting/clamping contact (102) extending outwardly/therefrom between respective pairs of projections (78, 76 or 74, 72). the median plane of each contact extends in the direction of the z-axis shown in FIG. 9, the median plane also however being arranged at 45° to opposed pairs of faces (72a, 74a, or 76a, 78a) of the respective projections (72, 74, or 76, 78) between which the contacts extend. The aforementioned clamping slots (94, 96) defined by these pairs of faces thus also extend at 45° to the median planes of the cutting/clamping contacts (102) of each contact, 100) and also at 45° to the "horizontal" median plane of connector (24). In order to so retain the contacts, the projections are provided with lengthwise slots (118) (FIG. 13) which receive the side edges of the cutting/clamping contact (102). In this fashion, contacts (98) are retained in the slots (94, 96) at the other end of the connector.

The cutting/clamping contacts (102) of contacts (98, 100) are arranged in known a fashion to permit interconnection with insulated electric conductors, the conductors being inserted between a pair of projections (72, 74 or 76, 78) with the wire extending parallel to the faces (72a, 74a or 76a, 78a) when viewed from the end of the connector as in FIG. 12, each gap (110) being dimensioned, and the legs (102a, 102b) being so configured, as to cause the legs to cut into the insulation on the wire and make electrical connection from the respective contact (98 or 100) to the wire as the wire is so pressed-into the gap (110). As mentioned, the pairs of projections (72, 74, 76, 78) are provided with clamping ribs (112), which engage the wire insulation at opposite sides. The actual insertion of the wires can, most conveniently, be effected by use of the tool described in Australian patent 547, 489.

By virtue of the described manner of fitting the two sections (24a, 24b) together, the clamping slots (94, 96) at one end of the connector (24) extend, when viewed lengthwise of the connector (i.e., along axis "x") at 90° to the clamping slots (94, 96) at the other end. By this arrangement, torsional effects created by the disconnection of wires at either end of the connector compensate each other.

Figure 14:
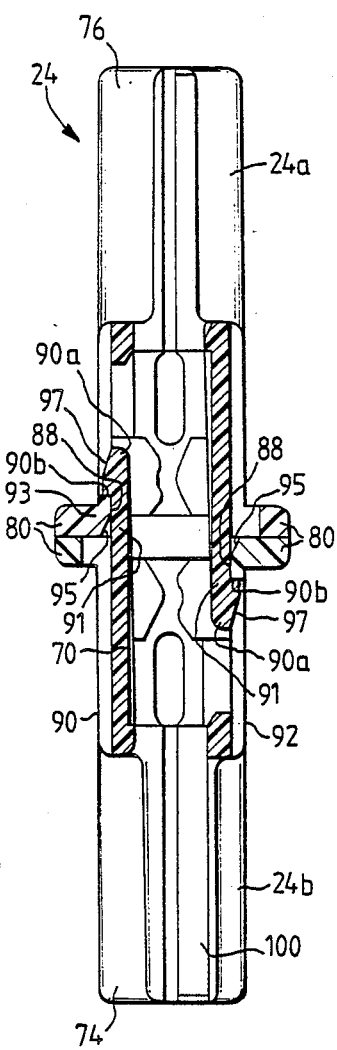
FIG. 14 is a cross section taken along the line 14—14 of FIG. 12.

The manner of interconnection of the two sections (24a, 24b) is shown particularly in FIG. 14. As previously described, the two sections (24a, 24b) abut at the flanges (80). The main body portions (70) are each apertured at one of the major faces thereof, being provided with apertures (88). Resilient tongue-like detents (91) extend from the portions (70), these having enlarged hook-like end portions (90a) which are outwardly directed and which snap fit at surfaces (90b) behind transverse latching portions (93) formed on portions (70) adjacent the apertures (88).

Snap-fitting together of sections (24a, 24b) is effected by moving the two sections one towards the other so that the portions (90a) of the detents (91) enter apertures (88) and are brought into engagement with the transverse latching portions (93) of the two sections (24a, 24b). In this circumstance, inclined outer faces (97) of the portions (90a) then engage inclined inwardly directed faces (95) on the portions (93) and, by camming action, resiliently deform the ends of the detents (91) inwardly towards each other until, as the flanges (80) of the two sections are brought together, the portions (90a) of the detents (91) are moved past the transverse latching portions (93) to allow the free ends of detents to again, under natural resilience of the detents, move outwardly to latch the portions (90a) behind the transverse latching portions (93). In the assembled condition, the sections (24a, 24b) are clamped together in that movement of the two sections away from each other is limited by engagement of inwardly stepped surfaces (90b) on the detent portions (90a) with the transverse latching portion (93) whilst movement of the two sections towards each other is prevented by engagement of the flange (80) of the two sections (24a, 24b).

The two sections (24a, 24b) can, however, be removed one form the other by suitable inward movement of the end portions (90a) of the two detents (91) to permit the end portions to clear from the latching apertures (88), moving under the transverse latching portions (93).

Figure 13:
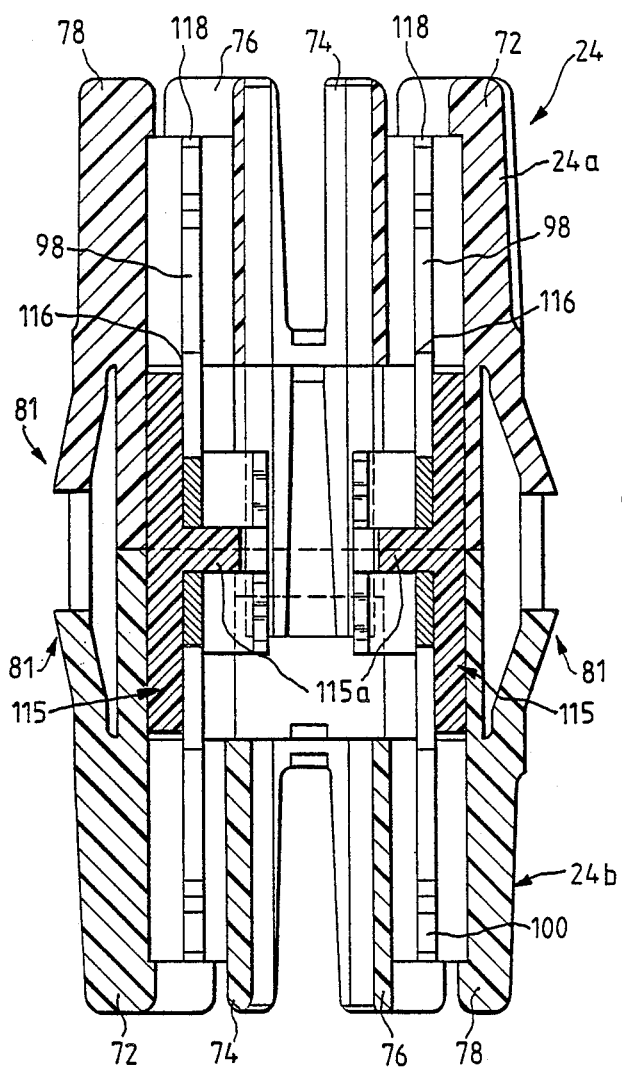
FIG. 13 is a cross section taken along the line 13—13 of FIG. 11.

Prior to assembly of the two sections (24a, 24b) the contacts 98, 100 may be positioned within the sections by sliding these inwardly from openings in the inner ends of the portions (70) so that these pass out through apertures (116) in the opposite end of the respective portion (70), being the end from which the projections (72, 74, 76, 78) extend. As previously described, the portions (102) of the contacts are then positioned between respective pairs of projections (72, 74 or 76, 78). Although the contacts slide in and are maintained in position in the slots (118) extending along faces (72a, 74a, 76a, 78a) of the projections, they are prevented from being moved fully outwardly relative thereto by virtue of these slots (118) terminating, as shown in FIG. 13, somewhat short of the free ends of the projections.

At inner ends, inward movement of the contacts (98, 100) is prevented by insertion of retaining pieces (115) one to either side of the connector (24). These are inserted into openings adjacent the openings which receive the contacts (98 or 100) of one of the sections (24a, 24b) before the two sections are positioned together, and are then entered into the corresponding openings on the other of the two sections as the two sections are brought together to complete the assembly. Sidewardly directed portions (115a) of the retaining pieces (115) are positioned between the inner ends of the pairs of aligned contacts (98, 100) to separate the contacts of each pair.

Figure 16:
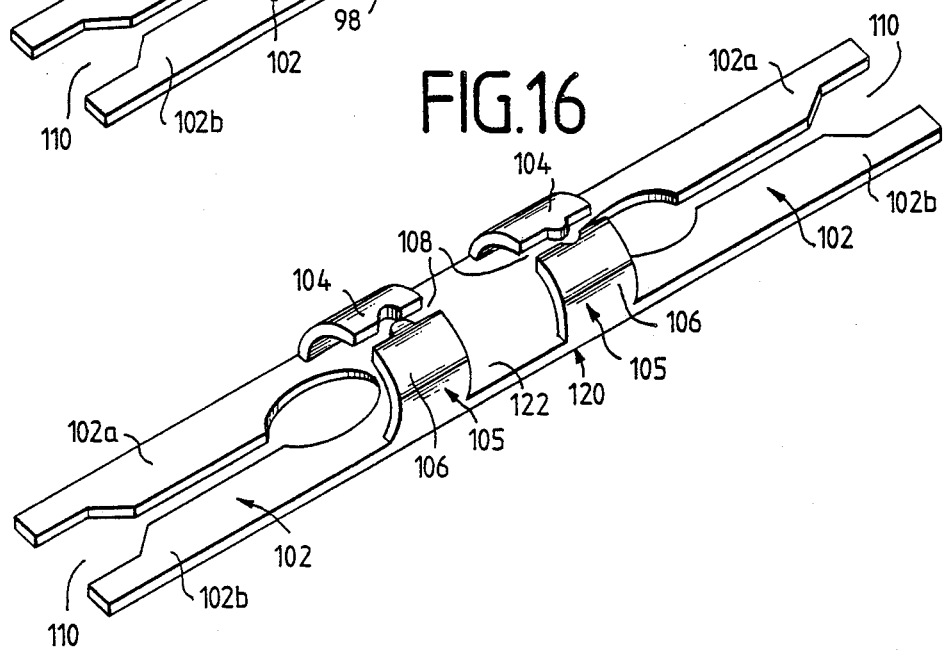
FIG. 16 is a perspective view of a connection contact capable of incorporation into the connector of FIG. 9.

FIG. 16 shows an alternative "connection" contact (120) which may be positioned in a connector (24) instead a pair of disconnection contacts (98, 100) as previously described. The contact (120) is generally configured so as to correspond to two disconnection (98, 100) contacts joined end to end. Thus, each connection contact (120) has oppositely directed planar portions (102) which are slotted in the same fashion as portions (102) of the contacts (98, 100) and has two pairs of flanges (104, 106) each defining a separate inner contact part (105) of the contact (120). At inner ends, however, the two portions (102) are joined by an intermediate portion (122) of the connection contact (120). Gaps (108) are formed between the free ends of the flanges (104, 106) in the same fashion as described in relation to the disconnection contacts. When the disconnection contacts (98, 100) are positioned in the connector (24) there is no electrical interconnection provided between each contact (98) and its aligned contact (100) at the opposite end of the connector. On the other hand, when a connection contact (120) is so positioned the connection contact provides interconnection between electrical connections which are made at either end of the connector (24). A separate contact (120) may replace a single pair of contacts (98, 100) or one may replace a single pair of contacts (98, 100) in the connector (24).

The connector (24) has a central lengthwise extending opening (124) therethrough, this extending, on a lengthwise axis (169), through the opposed body portions (70) and opening to outer surfaces thereof at locations between respective pairs (22) of projections (74, 76). As best shown in FIG. 12, the opening (124) is of generally cylindrical configuration but has opposed lengthwise extending side slots, formed in its peripheral surface one slot (126) to either lateral side thereof as viewed in FIG. 12, as well as opposed "upper" and "lower" slots (128), also extending lengthwise of the opening. The diameter of the opening (124) is rather greater than that of the spacing between the projections (74, 76) and the opening is extended lengthwise along opposed faces of these legs by the provision of concave cylindrical surfaces (130, 132) therein, these surfaces also having portions which define continuations of the slots (126). The slots (128) however, break into the outer end surfaces of the portion (70) at locations between the projections (74, 76).

Figure 17:
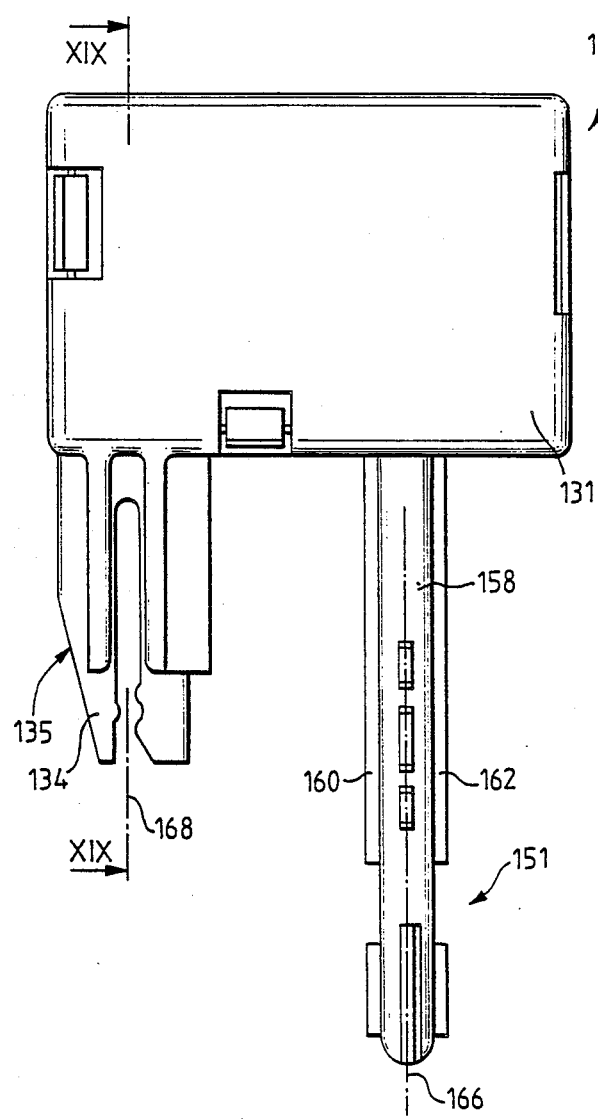
FIG. 17 is a plan view of an over-voltage protection unit capable of being inserted into the connector of FIG. 9.
Figure 18:
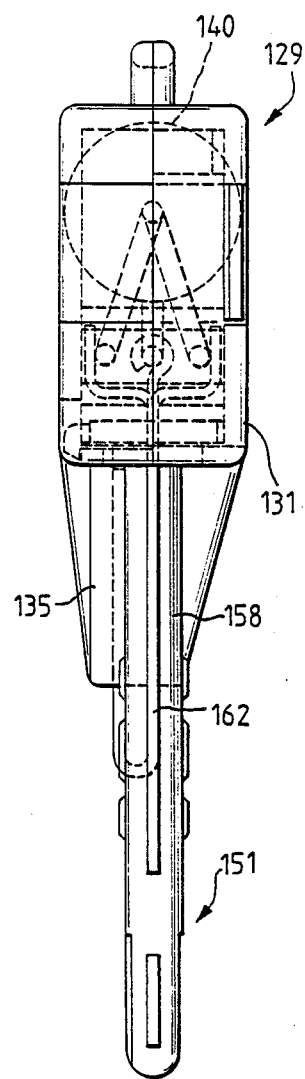
FIG. 18 is a side view of the over voltage protection unit of FIG. 17.
Figure 23:
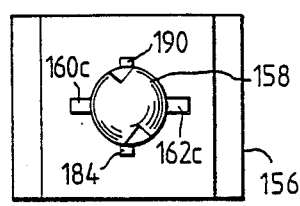
FIG. 23 is an end view of the connector member of FIG. 21.
Figure 21:
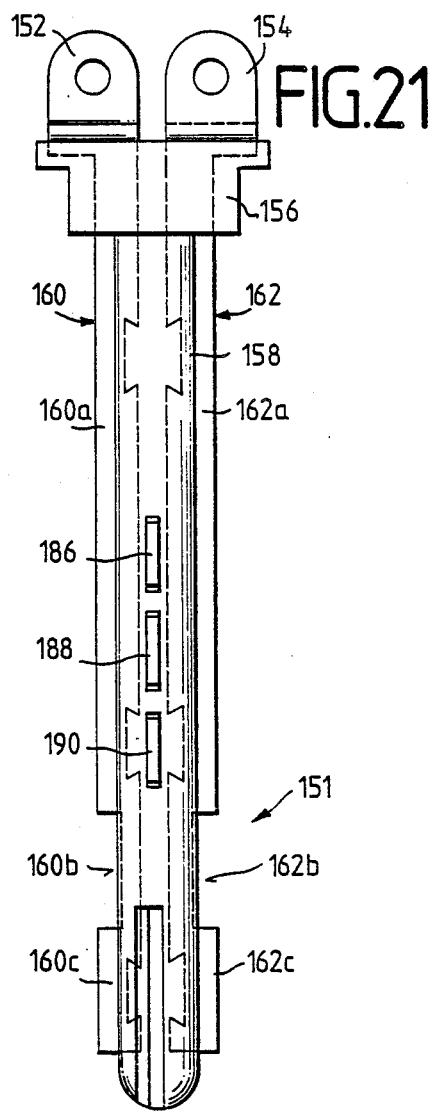
FIG. 21 is a plan view of a connector member of the overvoltage protector unit.
Figure 22:
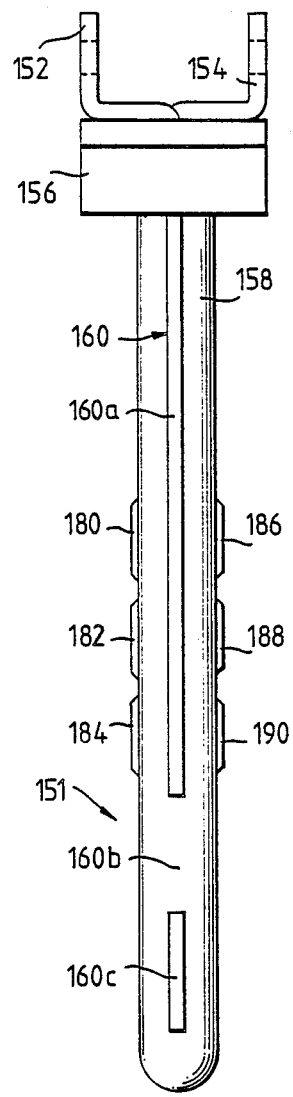
FIG. 22 is a side view of the connector member of FIG. 21.

The slots (126) are aligned with gaps (108) between the opposed flanges 104, 106) on the contacts (98, 100 or 120) to permit electrical connections to be made to the contacts for various purposes as next described. More particularly, FIG. 17 shows an electrical component, comprising an over-voltage protection unit (129), which may be so interconnected. The unit (129) is in the form of a generally box-shaped hollow casing (131) which may, for example, be formed of two halves suitably secured together, such as by snap fasteners.

A shaped projection (135) extends from one face of the casing (131) and carries an electrical contact element (134). This element (134) is formed of an elongate strip like element bent to a generally U-shaped configuration when viewed from the side as best shown in FIG. 19 and 20, FIG. 20 depicting the internal components of the unit (129). The element (134) has an open ended slot (136) at its outer end so as to form, to either side thereof, respective prongs (134a, 134b). The element (134) is somewhat resilient and is capable of gripping therebetween one of the flanges (18, 20) on the mounting frame 12 to provide electrical connection thereto.

An over-voltage protection device 140) is provided within the casing (131), this providing two over-voltage protection devices (144, 146) arranged, physically in end-to-end relationship. The contact element (134) is connected via a suitable electrical conductor (142) to the junction between the two devices (144, 146).

The ends of the devices (144, 146) which are not coupled to the conductor (142) are connected via separate conductors (148, 150) through terminals (152, 154) of a connector member (151). Member (151) comprises a mounting section (156) and an outwardly extending elongate cylindrical projection (158) which extends therefrom. The mounting section (156) provides a mounting to casing (131) being positioned within a complimentary opening in the outer wall of the casing (131). When so positioned, the projection (158) extends outwardly from the casing in adjacent parallel relationship to the contact (134), but spaced therefrom.

Opposed elongate fin-like side contact elements (160, 162) are provided extending lengthwise along the projection (158), the elements being retained in slots extending lengthwise along the outer surface and providing connection to the respect the terminals (152, 154). As shown, each contact element extends in like fashion form the surface of the projection (158), over most of the length thereof. However, the elements (160, 162) do not project from the surface of the projection (158) over the whole of the length thereof. More particularly, each presents a portion (160a, 162a) respectively extending from the mounting section (156) to approximately two thirds of the length of the projection (158). Then, there is a cut-out portion (160, 162) and, over these cut-out portions, the contact elements do not extend from the surface of the projection (158). Following the cut-out portions, there are, adjacent the free end of the projection (158) respective end portions (160c, 162c) of the elements (160, 162) which portions again extend from the periphery of the projection (158).

The projection (158) also has, at diametrically opposed locations which are 90° displaced relative to the locations of the elements (160, 162) when the projection (158) is viewed axially of the connector member (151), opposed integrally formed non-conductive fin-like keying projections (180, 182, 184, 186, 188, 190). projections (180, 182, 184) are spaced apart lengthwise along projection (158) and are positioned at locations approximately over the middle one third of the length of the projection (158). The projections (168, 188 and 190 are similarly positioned and arranged to be diametrically opposite to the locations of the respective projections (180, 182, 184).

When viewed in plan such as FIG. 17, the spacing between the axis (166) of the projection (158) and the axis (168) of the element (134) is arranged to correspond to the spacing between the axis (166) of the projection (158) and the axis (168) of the element (134) is arranged to correspond to the spacing between the median plane of each of the flanges (18, 20) on the mounting frame (12) and the axis (168) of the opening (124) in a connector (24) when such connector is positioned in an aperture (22) adjacent that particular flange (18, 20).

When viewed in cross-section, the projection (158) presents, at for example a location where both elements (160, 162) project from the surface thereof and where a pair of the diametrically opposed projections (180, 186 or 182, 188 or 184, 190) are present, a cross section which is complimentary to the cross section of the aforedescribed opening 124 in a connector (24). It is thus possible to position the unit (129) on the frame (12) by advancing the unit (129) theretowards so that one of the flanges (18, 20) is entered into the slot (136) in the element (134) and gripped by the element (134), whilst at the same time the projection (158) is entered into the opening (124), the elements (160, 162) being received in the opposed slots (126) of the opening (124), the respective sets of projections (180, 182, 184) and projections (186, 188, 190) being slidably receivable in the respective slots (128).

Figure 24:
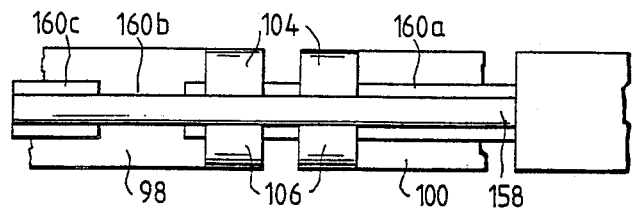
FIG. 24 is a diagram showing a first contacting position in which a contact element of the over-voltage protection unit of FIG. 17 engages two pairs of the contacts of the connector of FIG. 9.
Figure 25:
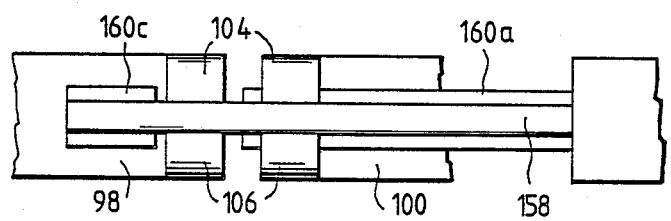
FIG. 25 is a diagram showing a second contacting position in which the contact element of the over-voltage protection unit of FIG. 27 engages one pair of contacts of the connector in FIG. 9.
Figure 26:
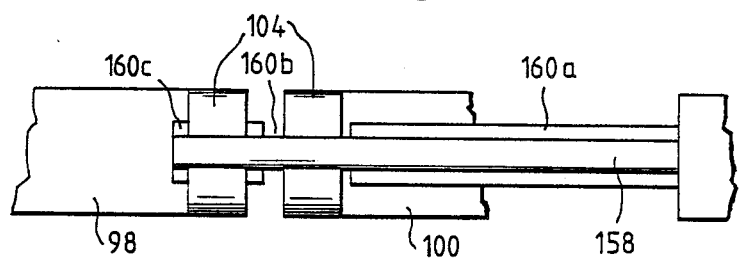
FIG. 26 is a diagram showing a third contacting position in which the contact element of the over-voltage protection unit of FIG. 17 engages another pair of contacts of the connector of FIG. 9.

The thickness of the elements (160, 162) is arranged such that these elements each pass through the gap (108) between the opposed free ends of flanges (104, 106) of the two side by side disconnection contacts (98, 100) or of connection contacts (120) in a connector (24), by engaging and slightly resiliently outwardly deforming the free ends of the flanges (104, 106) away from each other, thus to make electrical contact with inner contact parts (105) of the contacts (98, 100, or 120). The exact arrangement of this contacting may, however, be varied by varying the extent to which the unit (129) is pressed into a connector (24), whereby to similarly vary the extent to which the projection (158) is entered into the opening (124). FIGS. 24, 25, and 26 show the effect of different extent of such projection with reference to two of the disconnection contacts (98, 100) arranged in line to one side of a connector (24), it being understood that similar interconnection would occur in relation to two disconnection contacts (98, 100) when positioned at the other lateral side of the connector (24). More particularly, FIG. 26 shows a condition of least extensive such projection. Here, the cut-out portion (160b) of element (160) is positioned adjacent flanges (104, 106) of a "front" disconnection contact (100) (being the contact at the end of the connector (24) into which the projection (158) has been inserted) whilst portion (160c) is forced into the gap between the free ends of flanges (104, 106) of a "rear-most" disconnection contact (100) to make contact with that contact. Thus, in this condition, one of the two over-voltage protection devices (144, 146) is connected across the disconnection contact (100) and earth (i.e. the frame (12)) whilst no corresponding connection is made from the disconnection contact (98) through the other of the devices (144, 146).

In FIG. 25, a condition is shown at which, on further inward movement of the projection (158), cut-out portion (160b) is positioned adjacent the flanges (104, 106) of the rear disconnection contact (100) whilst portion (160) makes contact with the front disconnection contact (98). In this way, then, the other of the two devices 144, 146) is coupled to the disconnection contact (98) to earth, whilst no corresponding connection is made to the disconnection contact (100).

Finally, when the projection (158) is pressed fully inwardly of the connector 24, the rather longer portion (160a) makes contact with both disconnection contacts (98, 100) so that both devices (144, 146) are coupled from the disconnection contacts (98, 100) to earth.

The projections (180, 182, 184, 186, 188 and 190) are used for indexing the abovedescribed three positions under cooperation with a detent (not shown) within the connector (24).

Figure 27:
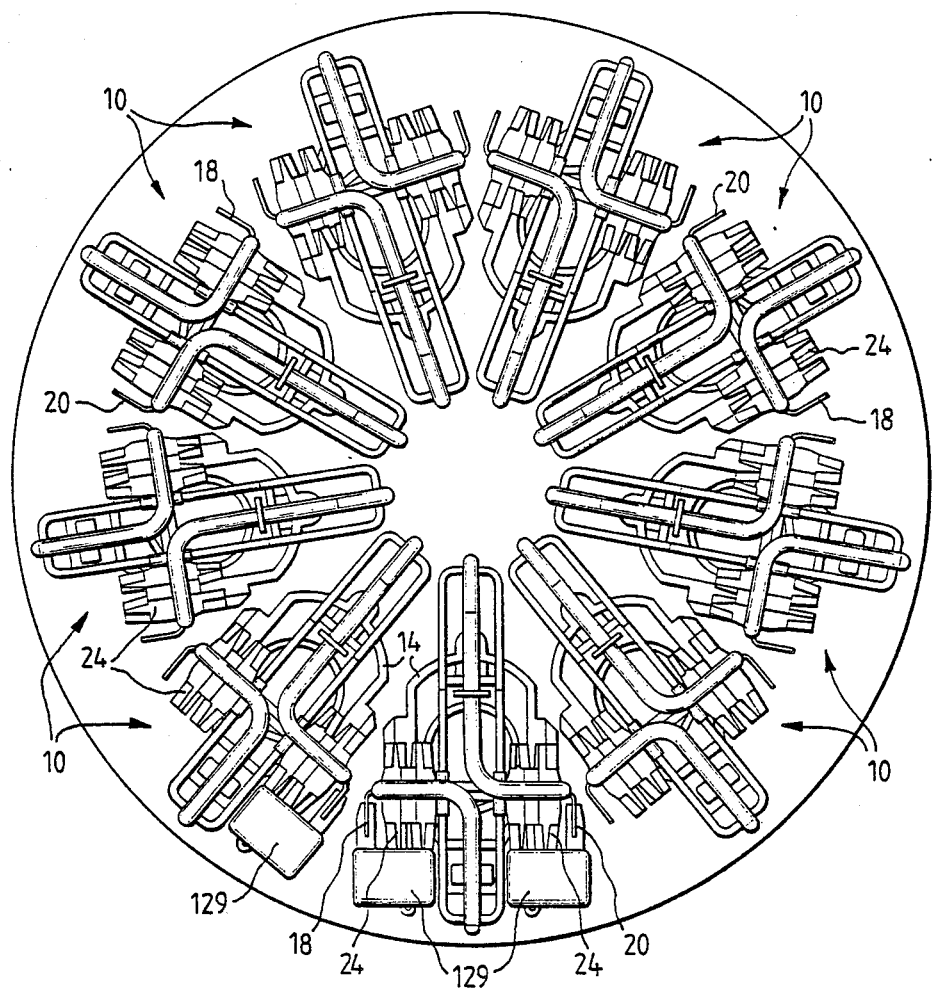
FIG. 27 is a plan view of a plurality of terminal units arranged in a telecommunications pillar and having connectors inserted therein, with some of the units also having over-voltage protection units attached thereto.

The described arrangement permits assembly of a number of terminal units (10) in circular arrangement in a cross connection unit as shown in FIG. 27. In this arrangement, "rear" faces of the frames (12) are arranged to face inwardly, with the flanges (18, 20) being outwardly directed. The connections from an exchange via the aforedescribed cable pairs (42) may be made to the rear faces of the frames (12), particularly to the ends of connectors (24) which project inwardly through the frames (12), when mounted thereon. Then, jumper leads may be provided between contacts (98, 100 or 120) of connectors (24) at the "outer" faces of the frames (12). As shown in FIG. 1, U-shaped retaining members (170, 172) and an upright support (174) may be provided to assist in retaining wires used to effect the above interconnections.

The described arrangement permits the frames (12) to be decoupled from the frame carriers (14) at the lower ends thereof to enable them to be leaned outwardly by pivoting these generally about the lower ends thereof to enable access to be readily obtained to the sides of the connectors (24) positioned at the inner faces of the frames (12).

In an alternative embodiment, not illustrated, the frames (12) are pivotally interconnected at lower ends to the frame carriers (14).

While a specific embodiment of the invention has been shown and described in detail to illustrate the application of the principals of the invention, it will be understood that the invention may be embodied otherwise without departing from such principals.

What is claimed is:

1. Terminal for telecommunications systems cable pairs, comprising a mounting frame having a plurality of slots thereon, a cutting and clamping contact housing having two housing portions which are interengageable to form a casing, each part having a cutting and clamping electrical connector receiving recess, a cutting and clamping contact in each recess, the casing being engageable in a slot of said mounting frame and having a latching portion of a size to engage in the slot of said mounting frame so that each housing portion is fixed to said mounting frame and extends to a respective side of said mounting frame, said casing being formed by housing portions which have interconnectable joints including a latching member on one and a slot on the other into which said latching member is interengageable as a releasable detent; a frame carrier, said mounting frame including downwardly extending leg portions; and, mounting frame connection means for connecting said frame carrier with said mounting frame leg portions including resilient interlocking means.

2. A terminal unit according to claim 1 wherein said casing has a pair of cable clamping slots with projections protruding from each side of said mounting frame when said casing is engaged in said slot, said projections for guiding said cable pairs which extend at an angle of substantially 45° to a longitudinal axis of a median plane of said contact housing so that said cutting and clamping contacts extend parallel to said median plane of the connector.

3. Terminal unit according to claim 1 wherein said casing includes a pair of guide projections extending outwardly from at least one end of said casing at an angle of substantially 90° to said cable receiving recesses.

4. A terminal unit according to claim 1 wherein said frame carrier provides a mounting for said mounting frame holding said mounting frame in a substantially vertical orientation said mounting frame being pivotal on said carrier under a flecture of cable pairs.

5. A terminal unit according to claim 1 wherein said casing is formed of two housing parts with an opening being provided at the connection of said two parts to permit an electrical component including an outwardly extending projection with a slide contact element to be passed thereinto to make connection with an inwardly positioned guide contact part electrically coupled with at least one of said cutting and clamping contacts.

6. A terminal unit according to claim 5 wherein said cutting and clamping contacts are aligned in an end to end direction in said casing and that each cutting and clamping contact has an inwardly positioned electrical contact part formed therewith located to enable said guide contact part to be selectively contacted to one of said current cutting and clamping contacts in dependence on the extent to which said projection of said electrical component is inserted into the opening.

7. A terminal according to claim 1 wherein said mounting frame downwardly extending leg portions including apertures, said frame carrier having retaining structures including a resilient tongue which is mounted on a base and connected to said mounting frame, said mounting frame apparatus and said frame carrier retaining structure forming said mounting frame connection means, said tongues being engageable with said apertures, said tongues having abutments which hold the mounting frame in position.

8. Terminal according to claim 7 wherein said retaining structures include pockets said mounting frame includes fingers which during movement of said mounting frame toward said frame carrier, enter said tongue into said apertures positioned in pockets in the retaining structures to fix the mounting frame on the frame carrier.

9. A terminal unit according to claim 1, wherein said mounting frame comprises a channel shaped structure having a central webbed portion and a flange at each end defining said downwardly extending leg portions, one of said downwardly extending leg portions being formed on each side of a cut-out, said cut-out being located at one end of said mounting frame said downwardly extending portions each defining an aperture.

10. A terminal unit according to claim 9, wherein on opposed inner edges of said legs the webbed portion is deformed out of a plane of the mounting frame to form fingers, said fingers extending generally parallel to said flanges but being at the opposite end of said webbed portion.

11. A terminal unit according to claim 9 further comprising mounting apertures provided in the webbed portion of said mounting frame, said mounting apertures being located in rows extending lengthwise of the mounting frame one row adjacent each of said flanges, said electrical connectors being removably mounted in said mounting apertures.

12. A terminal unit for cable pairs in telecommunication systems comprising:
a mounting frame having a plurality of mounting frame receiving slots;
a plurality of electrical connectors, each electrical connector including a first connector body section, and a second connector body section, said second connector body section being substantially identical to said first connector body section, each body section having connection elements, said connection elements of said first connector body engaging said connection elements of said second connector body to form a connection casing;
a pair of cutting/clamping contacts, positioned within said casing, each of said first and second connector body sections defining clamping slots, said cutting/clamping contacts extending in a corresponding said clamping slot;
latching means positioned on opposed outer faces of said casing of each of said plurality of electrical connectors, for latchable and releasable connection of each electrical connector with a receiving slot of said mounting frame, such that said first connector body section protrudes from one side of said mounting frame and said second connector body section protrudes from another side of said mounting frame, said mounting frame including downwardly extending leg portions;
a frame carrier including means for receiving cable pairs; and,
mounting means associated with each of said frame carrier and said mounting frame for connecting said mounting frame downwardly extending portions with said frame carrier, said mounting means including resilient member locking means cooperating with said downwardly extending portions.

13. A terminal unit according to claim 12, wherein: said mounting frame includes a central web portion and first and second flange members connected to said central web portion, said flange members being substantially perpendicular to said web portion, said web portion defining said slots, said leg portions being positioned adjacent said first and second flange members respectively, at a lower end of said mounting frame, said first and second leg portions defining a cut-out portion at a lower end of said web portion, first and second fingers extending from adjacent said first and second leg portions, substantially perpendicular to said web portion, each of said first and second legs defining apertures for pockets of said frame carrier, said fingers, said apertures and said pockets defining said mounting means.

14. A terminal unit according to claim 12, wherein said mounting frame includes a central web portion defining said receiving slots, said receiving slots being arranged in rows extending lengthwise along the mounting frame, first and second flange portions being connected to said central web portion extending substantially perpendicular to said web portion, said first and second connector bodies each including a pair of guide projections, each pair of guide projections defining a clamping slot, said guide projections extending at an angle of substantially 45° to a lengthwise central plane of said electrical connector.

15. A terminal unit according to claim 14, wherein each of said first and second connector bodies includes a central opening in communication with each of said pairs of cutting/clamping contacts, an electrical component having a projection insertable into said connector opening for connection with said cutting/clamping contacts, said electrical component having a further contact element for engagement with one of said first and second flange of said mounting frame.

16. A terminal unit according to claim 15, wherein each of said cutting/clamping contacts includes a separate electrical contact part adjacent and in communication with said opening, said projection of said electrical component having a plurality of projection contact elements positioned so as to make contact with different cutting/clamping contact parts depending upon the degree said projection is inserted into said opening.

* * * * *